United States Patent [19]

Inoue et al.

[11] Patent Number: 4,514,370

[45] Date of Patent: Apr. 30, 1985

[54] PROCESS FOR PREPARING SILICON NITRIDE POWDER

[75] Inventors: Hiroshi Inoue, Kawaguchi; Katsutoshi Komeya, Oiso; Akihiko Tsuge, Yokohama; Kazunari Koide, Kariya; Masaaki Mori, Okazaki; Tetsuro Urakawa, Kariya, all of Japan

[73] Assignees: Tokyo Shibaura Denki Kabushiki Kaisha, Kawasaki; Toshiba Ceramics Co., Ltd, Tokyo, both of Japan

[21] Appl. No.: 618,524

[22] Filed: Jun. 8, 1984

Related U.S. Application Data

[63] Continuation of Ser. No. 443,680, Nov. 22, 1982, abandoned.

[30] Foreign Application Priority Data

Nov. 25, 1981 [JP] Japan .................................. 56-187762

[51] Int. Cl.³ .......................................... C01B 21/068
[52] U.S. Cl. ........................................ 423/344; 501/97
[58] Field of Search ........................... 423/344; 501/97

[56] References Cited

U.S. PATENT DOCUMENTS 4,264,565 4/1981 Inoue et al. .......................... 423/344
4,368,180 1/1983 Inoue et al. .......................... 423/344
4,428,916 1/1984 Komeya et al. ................. 423/406 X

FOREIGN PATENT DOCUMENTS 47143    3/1982  European Pat. Off. .
2642554  4/1977  Fed. Rep. of Germany ...... 423/344
2814235  8/1978  Fed. Rep. of Germany .
52-38500 3/1977  Japan .
53-102300 9/1978 Japan .
1579417 11/1980 United Kingdom .

OTHER PUBLICATIONS

Komeya, "Synthesis of the $\alpha$ Form of Silicon Nitride from Silica", J. Mat. Sci. 10 pp. 1244–1246, 1975.

*Primary Examiner*—William R. Dixon, Jr.
*Assistant Examiner*—Steven Capella
*Attorney, Agent, or Firm*—Schwartz, Jeffery, Schwaab, Mack, Blumenthal & Koch

[57] ABSTRACT

Disclosed is a process for preparing silicon nitride powder, which comprises baking a powdery mixture comprising (i) 1 part by weight of silica powder, or a silica-containing substance in terms of silica, (ii) 0.4 to 4 parts by weight of carbon powder, or a substance generating carbon by baking, in terms of carbon and (iii) 0.005 to 1 part by weight of silicon nitride powder synthesized by a silica reduction method, at a temperature of from 1350° to 1550° C. in a non-oxidative atmosphere containing nitrogen.

13 Claims, No Drawings

PROCESS FOR PREPARING SILICON NITRIDE POWDER

This is a continuation of application Ser. No. 443,680, filed Nov. 22, 1982, now abandoned.

BACKGROUND OF THE INVENTION

This invention relates to a process for preparing silicon nitride powder. More particularly, it relates to a process for preparing silicon nitride powder containing α-form silicon nitride in a high proportion, being of high purity and homogeneity, and having uniform grain size and shape.

Since ceramics made of silicon nitride have high bonding strength and superior heat resistance, there has been expected that such ceramics would be applicable in strengthening materials or abrasion-resistant materials used at high temperatures. When the materials are used for such a purpose, the strength of the materials is determined by the density of the materials per se, or influenced by the size of defective hollows present inside the materials. Accordingly, it has been required for such materials to contain substantially no defective hollows and to have dense and homogeneous structures. In particular, it has been desired that the raw powdery materials be of higher quality.

The following methods are known for synthesizing the above-mentioned silicon nitride powder;

(1) Direct reaction method (in which metallic silicon powder is directly nitrogenated):

$$3Si + 2N_2 \rightarrow Si_3N_4$$

(2) Vapor-phase reaction method (in which silicon tetrachloride or silane is reacted with ammonium in a vapor-phase, for example):

$$3SiCl_4 + 4NH_3 \rightarrow Si_3N_4 + 12HCl$$

(3) Silica reduction method (in which SiO obtained by reducing silica ($SiO_2$) with substantially a stoichiometrical amount of carbon is nitrogenated; the source of silica may broadly include those having an organic group):

$$3SiO_2 + 6C + 2N_2 \rightarrow Si_3N_4 + 6CO$$

Some of these methods have already been brought into practical use.

Of the above methods, method (1), the direct reaction method, which is an exothermic reaction, has problems in that it requires an elaborate apparatus for controlling the heat generated. In addition, the resultant silicon nitride powder is of grain size which is so coarse as to make it difficult to produce a sufficiently fine powder. On the other hand, method (2), the vapor-phase reaction method, is suitable, for example in coating the surface of a semiconductor element because the silicon nitride is obtainable in high purity, but inevitably renders its procedures troublesome because it requires a treatment for removing hydrogen halide or the like formed by the reaction when a compound containing a halogen, such as silicon tetrachloride, is used. In addition, this method also suffers disadvantages for example the grain size and shape of the resultant silicon nitride powder are not only nonuniform, but also difficult to regulate.

Method (3), the silica reduction method, is advantageous in that the reaction is easy to carry out and, on the other hand, disadvantageous in that it results in poor yield of α-form silicon nitride which is useful as a sintering material. The present inventors, who have made a variety of studies on the methods improving for the above-mentioned silica reduction method, already found, as proposed in the Japanese Patent Publication No. 23917/1979, an improved process for preparing silicon ceramics powder, which comprises adding, as a third component, a silicon nitride ($Si_3N_4$) or a silicon carbide (SiC) to a system comprising silica ($SiO_2$) and carbon (C) such as silica-carbon-silicon nitride system or silica-carbon-silicon carbide system, thereby having obtained silicon ceramic powder which is of improved homogeneity and of improved uniformity in grain size and shape.

SUMMARY OF THE INVENTION

It is therefore an object of this invention to further improve the above-mentioned silica reduction method.

It is an additional object of this invention to further improve the process in which the silicon nitride powder is prepared by the silica reduction method, thereby providing a process for preparing silicon nitride powder which contains α-$Si_3N_4$ in a higher proportion, and of a high purity, high homogeneity, and good uniformity in grain size and shape.

As a result of intensive studies, the present inventors have found that the properties (i.e. form, size, etc.) of the silicon nitride powder to be added as the third component greatly effects the reaction in the above-mentioned prior art silica reduction method, and also found that the above object of this invention can be attained by employing as the silicon nitride powder a silicon nitride powder synthesized by the silica reduction method.

Accordingly, the process for preparing silicon nitride powder of this invention is characterized by baking a powdery mixture comprising; (i) a first component of 1 part by weight of silica powder, or a silica-containing substance in terms of silica; (ii) a second component of 0.4 to 4 parts by weight of carbon powder, or a substance generating carbon by baking, in terms of carbon; and (iii) a third component of 0.005 to 1 part by weight of silicon nitride powder synthesized by a silica reduction method, at a temperature of 1350° to 1550° C. in a non-oxidative atmosphere containing nitrogen.

This invention will be described below in more detail.

DETAILED DESCRIPTION OF PREFERRED EMBODIMENTS

The silica-containing substance to be used in this invention and having been confirmed to be useful is exemplified by methylsilicic acid ($CH_3SiO_{3/2}$) which is a product obtained by hydrolysis of methyltrichlorosilane, or the like. It is preferable that the silica or the silica-containing substance has a grain size of not more than 1 μm, preferably of from 0.01 to 0.95 μm.

The carbon powder is exemplified by carbon black, graphite, lamp black carbon or the like. The substance generating carbon by baking is exemplified by every kind of resinous substances such as phenol-formaldehyde resin (e.g. novolak), resorcinol-formaldehyde resin and polystyrene; and hydrocarbon such as paraffine.

The silicon nitride powder to be used in this invention is synthesized by the silica reduction method. The silica reduction method herein mentioned is carried out, for example, by subjecting a powdery mixture having proportion of 1 part by weight of silica powder and 0.4 to 4 parts by weight of carbon powder together with or without 0.005 to 1 part by weight of silicon nitride powder and/or silicon carbide powder, to a heat treatment at a temperature of 1400° to 1550° C. in a non-oxidative atmosphere containing nitrogen.

The silicon nitride powder thus obtained should preferably have a grain size of 0.1 to 2 μm, more preferably 0.2 to 1 μm, and it is preferable that the grains are in the shape of uniform granules. Further, in order to obtain silicon nitride powder of higher purity, higher homogeneity and more uniform grain size and shape, it is preferable to repeatedly use the silicon nitride powder obtained by the process according to this invention, as a starting material or a seed material for performing the process of this invention. In such a case, unreacted carbon contained in the resultant silica nitride powder may not necessarily be removed.

The silicon nitride powder should preferably be of α-form crystals, which should be contained in the powder in an amount of not less than 50%. A material having excellent heat resistance or high temperature strength will not be obtainable if the crystals are not in α-form, when the silicon nitride powder is to be used for a sintering material. Accordingly, in order to obtain the α-form silicon nitride powder, it is preferable to employ as a starting material the silicon nitride powder containing a larger amount of α-form crystals, because the proportion of the starting or raw silicon nitride powder to be present in the resultant silicon nitride powder is enlarged when the silicon nitride powder to be added as the third component is in a larger amount, although there is no problem when it is in a smaller amount. Silicon nitride powder comprising a silicon nitride in which oxygen or aluminum is solid-solubilized may also be employed so far as the required amount of α-form silicon nitride powder is satisfied.

The reason why the proportion of silica-carbon-silicon nitride to be used as the starting materials in this invention is set to be $SiO_2:C:Si_3N_4 = 1:0.4\sim4:0.05\sim1$ (parts by weight), is as follows: If C is less than 0.4 part by weight relative to 1 part by weight of $SiO_2$, the $SiO_2$ will remain unreacted in part and only a small amount of α-$Si_3N_4$ will be formed, while a large amount of $Si_2ON_2$ will be produced. Yield of the α-$Si_3N_4$ will also be lowered if the C is more than 4 parts by weight. If $Si_3N_4$ is less than 0.005 part by weight relative to 1 part by weight of $SiO_2$, no $Si_3N_4$ having desired properties to be resulted from the reduction of silica will be obtained and, on the contrary, if it is more than 1 part by weight, yield of α-$Si_3N_4$ will be undesirably lowered because of an excess amount of $Si_3N_4$ powder added as the starting material.

The powdery mixture having the above composition is baked in a non-oxidative atmosphere containing nitrogen, which is exemplified by the atmosphere containing $N_2$, $NH_3$, $N_2$—$H_2$ or a mixture of $N_2$ and inert gas, provided, however, that it must be composed principally of $N_2$ or $NH_3$. The powdery mixture is baked in such an atmosphere as mentioned above and at a temperature ranging from 1350° to 1550° C. If the temperature is lower than 1350° C., $Si_3N_4$ is scarcely formed, and if it is higher than 1550° C., too much SiC is formed to obtain the desired α-$Si_3N_4$.

When carbon is used in an excess amount, it remains unreacted in part. Accordingly, it is preferable to subject the baked product to a heat treatment at 600° to 800° C. in an oxidative atmosphere, thereby removing by oxidation the remaining carbon.

It is considered that the mechanism by which the α-form silicon nitride is effectively obtainable by the process according to this invention is as follows. Namely, as an initial reaction, a reaction of $SiO_2+C\rightarrow SiO+CO$ proceeds. This reaction is a solid-phase reaction, in which SiO may be easily reacted with $N_2$ or $NH_3$ by a vapor-phase reaction to form α-$Si_3N_4$, and therefore the amount of carbon vapor influences the whole system of the reaction. In this case, $Si_2ON_2$ is formed with the result of decrease in the yield of $Si_3N_4$ if the amount of C is lower than the stoichiometrical amount, and, on the other hand, the desired α-$Si_3N_4$ is formed easily when the amount of C is in excess in comparison with the stoichiometrical amount as in this invention. However, the presence of an overly excess amount of C promotes the formation of α-$Si_3N_4$ on the one hand, and it results in the formation of impurities on the other hand; hence relatively lower yield of α-$Si_3N_4$.

Whereas, in this invention where $Si_3N_4$ powder is present in the mixture in advance, accumulation and growth of $Si_3N_4$ formed by vapor-phase reaction proceed rapidly with the aid of solid $Si_3N_4$ powder acting as nuclei. It is considered that formation of SiC is inhibited with such accumulation and growth of $Si_3N_4$ so that α-$Si_3N_4$ of very high purity and homogeneity and having uniform grain size and shape can be obtained.

Thus, when preparing $Si_3N_4$ powder by the silica reduction method, the $Si_3N_4$ powder to be used as a third component is the one synthesized by the same reduction method. This is because quality of the $Si_3N_4$ powder thus prepared is stable. It is first of all considered that the $Si_3N_4$ powder synthesized by the silica reduction method acts as source of nuclei for the accumulation and growth of the very stable $Si_3N_4$.

This invention will be described in more detail by the following Examples:

EXAMPLE 1

(1) Preparation of raw silicon nitride powder:

A starting material which is a powdery mixture composed of 1 part by weight of silica powder having mean grain size of 0.05 μm, 0.5 part by weight of lamp black carbon and 0.1 part by weight of silicon nitride powder containing 92% of α-$Si_3N_4$ having grain size of 0.7 μm, was baked in a carbon vessel at 1450° C. for 5 hours in a stream of 600 l/hr of nitrogen gas. Thereafter, the baked product was heated at 700° C. for 5 hours in the atmosphere to remove unreacted carbon, whereby obtained was 14.5 g of silicon nitride powder having grain size of 0.9 μm and containing 92% of α-$Si_3N_4$.

(2) Preparation of silicon nitride powder:

In a carbon vessel, introduced was 30 g of powdery mixture composed of 1 part by weight of silica powder having grain size of 0.05 μm, 0.5 part by weight of lamp black carbon and 0.1 part by weight of silicon nitride powder prepared by the silica reduction method referred to in the above (1). The mixture was then baked at 1450° C. for 5 hours in the atmosphere of nitrogen gas. The baked product thus obtained was further heated at 700° C. for 5 hours in the atmosphere to remove unreacted carbon remained therein, whereby obtained was 15 g of silicon nitride powder.

(3) Determination of the resultant product:

It was confirmed that the silicon nitride powder resultant from the above treatment was uniform powder, containing 98% of α-Si$_3$N$_4$, having grain size of 1.0 μm and having grain shape of a granule.

COMPARATIVE EXAMPLE 1

Silicon nitride powder was prepared in the same manner as in Example 1, except that, when preparing the silicon nitride powder mentioned in (2) of Example 1, the silicon nitride powder obtained by the silica reduction method was replaced by silicon nitride powder obtained by vapor-phase reaction method and having grain size of 0.2 μm. As the result, obtained was silicon nitride powder of coarse grains having grain size of 3 to 4 μm.

EXAMPLE 2

Prepared was raw silicon nitride powder by the silica reduction method in the same manner as in Example 1, except that methylsilicic acid obtained by hydrolysis of methyltrichlorosilane was used in place of the silica powder. This silicon nitride powder was subjected to grinding for 100 hours with a ball mill. By using the silicon nitride powder thus obtained, prepared was silicon nitride powder in the same manner as in Example 1. As the result, it was confirmed that obtained was uniform silicon nitride powder containing 96% of α-Si$_3$N$_4$, having grain size of 0.7 μm and having grain shape of a granule.

EXAMPLE 3

Prepared was two kinds of silicon nitride powder by the same procedures as in Example 2, except that the amount of silicon nitride contained in the powdery mixture, which was used in Example 2 in the amount of 0.1 part by weight relative to 1 part by weight of silica for preparing the silicon nitride powder, was replaced by 0.05 part by weight and 0.01 part by weight, respectively. It was confirmed that each of the silicon nitride powder thus prepared has fine and uniform grain size and shape as in the case of Example 1 or Example 2.

COMPARATIVE EXAMPLE 2

Prepared was silicon nitride powder in the same manner as in Example 3, except that the raw silicon nitride powder to be used for preparing the silicon nitride powder was replaced by the one prepared by vapor-phase reaction. As the result, obtained was silicon nitride powder having grain size of larger than 2 μm, and it was noted that grains have become coarse.

As is apparent from the above Examples and Comparative Examples, the process for preparing silicon nitride powder according to this invention can produce silicon nitride powder containing α-Si$_3$N$_4$ in a high proportion, and yet containing very small amount of impurities such as SiC, being of high purity and homogeneity, and having uniform grain size and shape.

We claim:

1. A process for preparing silicon nitride powder, which comprises baking a powdery mixture comprising (i) 1 part by weight of silica powder, or a silica-containing substance in terms of silica, (ii) 0.4 to 4 parts by weight of carbon powder, or a substance generating carbon by baking, in terms of carbon and (iii) 0.005 to 1 part by weight of silicon nitride powder synthesized by a silica reduction method, at a temperature of from 1350° to 1550° C. in a nonoxidative atmosphere containing nitrogen.

2. The process according to claim 1, wherein silicon nitride powder having grain size of 0.1 to 2 μm is employed as said silicon nitride powder.

3. The process according to claim 1, wherein silicon nitride powder containing not less than 50% of α-Si$_3$N$_4$ is employed as said silicon nitride powder.

4. The process according to claim 1, wherein said silica reduction method is carried out by subjecting a powdery mixture comprising 1 part by weight of silica powder and 0.4 to 4 parts by weight of carbon powder together with or without 0.005 to 1 part by weight of silicon nitride powder and/or silicon carbide powder, to a heat treatment at a temperature of from 1400° to 1550° C. in a non-oxidative atmosphere containing nitrogen.

5. The process according to claim 1, wherein said silicon nitride powder synthesized by a silica reduction method is obtained by the process as defined in claim 1.

6. The process according to claim 1, wherein said silica containing substance is a methylsilicic acid.

7. The process according to claim 1, wherein said substance generating carbon by baking is selected from the group consisting of phenol-formaldehyde resin, resorcinolformaldehyde resin, polystyrene and hydrocarbon.

8. The process of claim 1, further comprising the step of recycling a portion of the silicon nitride powder product to the process to be used as said starting silicon nitride powder.

9. The process according to claim 1, wherein said silica powder or said silica-containing substances has a grain size equal to or less than 1 μm.

10. The process according to claim 9, wherein said silica powder or said silica-containing substance has a grain size from about 0.01 to 0.95 μm.

11. The process of claim 2, wherein said silicon nitride powder has a grain size of 0.2 to 1 μm.

12. The process of claim 1, further comprising the step of heat treating the baked product at a temperature from 600° to 800° C. in an oxidative atmosphere.

13. A process for preparing silicon nitride powder, comprising the steps of:
preparing a starting silicon nitride powder by the silica reduction method by heat treating said starting silicon nitride powder at a temperature of 1400° to 1550° C. in a non-oxidative atmosphere containing nitrogen;
adding 0.005 to 1 part by weight of said silicon nitride powder with (i) 1 part by weight in terms of silica of silica powder or a silica-containing substance; and (ii) 0.4 to 4 parts by weight in terms of carbon of carbon powder, or a substance generating carbon upon baking, to form a powdery mixture; and
baking said powdery mixture at a temperature of from 1350° to 1550° C. in a nonoxidative atmosphere containing nitrogen.

* * * * *